United States Patent [19]
Shimizu

[11] Patent Number: 5,762,160
[45] Date of Patent: Jun. 9, 1998

[54] POWER STEERING DEVICE

[75] Inventor: Yoshinobu Shimizu, Sakai, Japan

[73] Assignee: Koyo Seiko Co., Ltd., Osaka, Japan

[21] Appl. No.: 625,851

[22] Filed: Apr. 4, 1996

[30] Foreign Application Priority Data

Apr. 17, 1995 [JP] Japan ................... 7-116434

[51] Int. Cl.$^6$ .................................................. B60R 21/00
[52] U.S. Cl. .................. 180/446; 180/443; 180/169
[58] Field of Search ........................ 180/167, 169, 180/421, 422, 443, 446

[56] References Cited

U.S. PATENT DOCUMENTS

| | | | |
|---|---|---|---|
| 5,177,462 | 1/1993 | Kajiwara | 180/167 |
| 5,373,911 | 12/1994 | Yasui | 180/446 |
| 5,461,357 | 10/1995 | Yoshioka et al. | 180/167 |
| 5,485,892 | 1/1996 | Kenji . | |
| 5,623,409 | 4/1997 | Miller | 180/443 |
| 5,667,033 | 9/1997 | Shimizu et al. | 180/446 |
| 6,600,559 | 2/1997 | Nishimoto et al. | 180/443 |

FOREIGN PATENT DOCUMENTS

| | | | |
|---|---|---|---|
| 04 019 274 | 1/1992 | Japan . | |
| 4-19274 | 1/1992 | Japan . | |
| 05 113 822 | 5/1993 | Japan . | |
| 5-294250 | 11/1993 | Japan . | |
| 07 047 967 | 2/1995 | Japan . | |

OTHER PUBLICATIONS

Patent Abstracts of Japan, vol. 095, No. 005, 30 Jun. 1995.
Patent Abstracts of Japan, vol. 016, No. 177 (M-1241), 28 Apr. 1992.

*Primary Examiner*—Daniel G. DePumpo
*Attorney, Agent, or Firm*—Reid & Priest L.L.P.

[57] ABSTRACT

A power steering device uses a control value set in accordance with a vehicle's detected steering torque to control an actuator, which generates steering assistance power. When the vehicle appears to be on a collision course with an obstacle detected in its steering direction, the control value is modified so as to inhibit the steering. The control value after the modification for the steering inhibition is a function of the control value prior to the modification. When the detected value of the steering torque is greater than the preset value, the function is modified such that the degree of steering inhibition is increased by comparison with a situation in which the detected torque is less than the preset value.

5 Claims, 9 Drawing Sheets

POWER STEERING DEVICE

FIELD OF THE INVENTION

The invention relates to a power steering device that enables a moving motor vehicle to avoid colliding with nearby obstacles.

DESCRIPTION OF THE RELATED ART

There is a conventional power steering device, which is intended to inhibit a vehicle's steering in cases in which there is a possibility of collision between the vehicle and a nearby obstacle, the object being to prevent a collision between the driver's vehicle and an obstacle adjacent to the left or right of the driver's vehicle or else adjacent to the right rear or left rear of the driver's vehicle, when undertaking a lane change or similar maneuver. The conventional device is also intended to inhibit the steering of the driver's vehicle in such a way that, when an obstacle is detected in a adjacent to left rear or right rear of the driver's vehicle, for example, the supply of steering assistance power is cut off, the driver's efforts to steer his vehicle is counteracted, or the driver's vehicle is controlled to remain in its original lane. By inhibiting the steering in this way, the device has the effect of warning the driver that there is a nearby obstacle (see Japanese patent laying open gazette H5-294250 and H4-19274).

In the case of a power steering device which controls a steering assistance power generation motor by means of a control signal with a value corresponding to the steering torque detected by a torque sensor, the sort of steering inhibition outlined in the preceding paragraph can be effected by modifying the control value, whenever there is a possibility of collision with a nearby obstacle.

However, if the level of steering inhibition is inadequate, it can not provide the driver with reliable warnings of nearby obstacles. On the other hand, excessive steering inhibition causes the driver to make a vehicle handling mistake.

It is possible to remedy these defects by treating the control value after modification for steering inhibition as a function of the control value prior to the modification, thereby inhibiting the steering of the vehicle in such a way as to create a suitable match with the steering torque at the point when the possibility of collision with an obstacle arose. In other words, by applying steering inhibition of sufficient strength to match the strength of the steering torque at the point when the possibility of collision with an obstacle arises, the potential for inadequate steering inhibition is avoided and the driver is clearly warned of the presence of an obstacle. Similarly, when the steering torque at the point when the possibility of collision with an obstacle arises is only small, the strength of the steering inhibition is reduced to match the strength of the steering torque, thereby precluding the occurrence of excessive steering inhibition and preventing the driver from making a mistake in his/her handling of the vehicle.

However, in cases in which the steering torque is changed abruptly as the result of a sudden change in the course of the vehicle, or else the driver generates a high degree of steering torque by forcing the steering wheel against the direction of the steering inhibition, since the actual value of the steering torque exceeds the detection limit of the torque sensor, it is impossible to detect the actual value of the steering torque. In this sort of situation, it is no longer possible to exercise steering inhibition matching the actual steering torque simply by treating the control value after modification for the steering inhibition as a function of the control value prior to the modification, therefore there is a danger that the level of steering inhibition is inadequate.

It is an object of the present invention to provide a power steering device with the capacity to resolve the problems outlined above.

SUMMARY OF THE INVENTION

The power steering device of the present invention comprises means for detecting a steering torque, means for controlling the steering assistance power generation actuator by using a control value corresponding to the detected steering torque, means for determining whether or not there is a possibility of collision between the vehicle and an obstacle detected in the steering direction, and means for modifying the control value such that the vehicle's steering is inhibited when there is the possibility of collision. The control value after the modification for the steering inhibition is a function of the control value prior to the modification. When the possibility of a collision between the driver's vehicle and a nearby obstacle arises, the above configuration makes it possible to inhibit the vehicle's steering by modifying the control value of the actuator used to generate power to assist the steering operation. By making the control value after modification for steering inhibition a function of the control value prior to the modification, it is possible to inhibit the steering so as to match the steering inhibition to the steering torque. In other words, when the steering torque at the point when the possibility of collision with an obstacle arises is large, the strength of the steering inhibition can be increased to match the size of the steering torque, the potential for inadequate steering inhibition is avoided and the driver is clearly warned of the presence of an obstacle. Also, when the steering torque at the point when the possibility of collision with an obstacle arises is small, the strength of the steering inhibition can be reduced to match the size of the steering torque, thereby precluding the occurrence of excessive steering inhibition and preventing the driver from making a mistake in his/her handling of the vehicle.

The first salient feature of the present invention is the way in which, when the detected steering torque is greater than a preset value, the function is modified such that the degree of steering inhibition is increased by comparison with a situation in which the detected steering torque is less than the preset value. This configuration makes it possible in cases in which the steering torque exceeds the detection limit of the torque sensor, to prevent the resultant steering inhibition from being inadequate. To be more precise, in the event that the detected steering torque is greater than the detection limit of the torque sensor, the function is varied in such a way that the degree of steering inhibition is increased beyond that which is applied if the detected steering torque is within the sensor's detection range, thereby enabling adequate steering inhibition to be applied and providing the driver with a clear warning that there is an obstacle in his/her path.

The second salient feature of the present invention is the way in which, when the rate of change of the detected steering torque is greater than a preset value, the function is modified such that the degree of steering inhibition is increased by comparison with a situations in which the rate of change of the detected steering torque is less than the preset value. This configuration makes it possible in cases in which the steering torque exceeds the detection limit of the torque sensor, to prevent the resultant steering inhibition from being inadequate. To be more precise, steering, which causes the steering torque to exceed the detection limit of the torque sensor, is violent steering. Thus, in the event that the rate of change of the detected steering torque is greater than the preset value, which corresponds to the rate of change of the steering torque that is required to force the steering torque value up beyond the detection limit of the torque sensor, the function is varied such that the degree of steering inhibition is increased beyond that which is applied if the rate of change of the steering torque is less than the preset value, thereby enabling adequate steering inhibition to be applied, and providing the driver with a clear warning that there is an obstacle in his/her path. Again, although a torque sensor's detection limit is dependent on the precision of assembly of the torque sensor, the function can be modified as necessary without receiving any influence of the precision of assembly of the torque sensor, because the question of whether or not the steering torque reaches the detection limit or not is determined by reference to the rate of change of the torque.

The third salient feature of the present invention is the way in which, when the detected steering torque is greater than a preset value, the function is modified such that the degree of steering inhibition is increased by comparison with a situation in which the detected steering torque is less than the preset value, and also when the rate of change of the detected steering torque is greater than a preset value, the function is modified such that the degree of steering inhibition is increased by comparison with a situation in which the rate of change of the detected steering torque is less than the preset value. In other words, the third salient feature incorporates both the first and the second salient features outlined above at the same time.

It is desirable, moreover, when the rate of change of the detected steering torque is greater than the preset value, the control value after modification is determined such that the degree of steering inhibition is gradually reduced. In other words, in cases in which the rate of change of the detected steering torque exceeds the set value, the second and third salient features of the present invention outlined above ensure that the degree of steering inhibition is increased. Thus, if the control value after modification is kept at the level, when the driver turns the steering wheel back in response to his/her awareness of the presence of a nearby obstacle, the degree of steering inhibition is excessive and there is a danger that he/she pulls the steering wheel back too far and finish up swerving in the opposite direction. Also, when steering inhibition is applied, the driver is not aware of its application at first and resist the steering inhibition by trying to increase the steering torque. Thus, when varying the control value in order to carry out steering inhibition, it is desirable that the control value after modification is varied in such a way that the degree of steering inhibition is gradually reduced. Therefore, it is possible to increase the degree of steering inhibition at first to warn the driver of the presence of an obstacle in his/her vicinity at first, and thereafter to prevent the degree of steering inhibition from becoming excessive.

DETAILED DESCRIPTION OF THE PREFERRED EMBODIMENT

There follows a description of the preferred embodiment of the invention by reference to the attached drawings.

Figure 1:
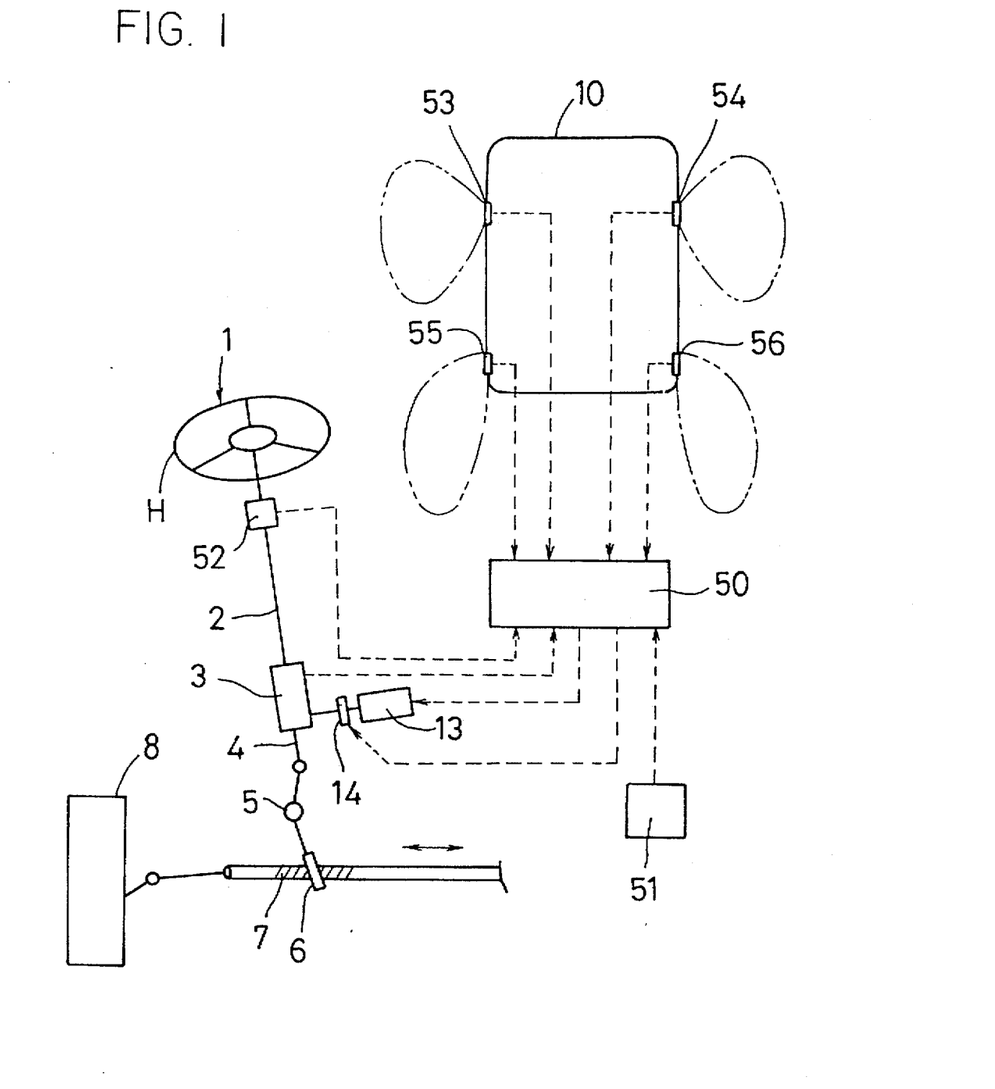
FIG. 1: Explanatory drawing illustrating the configuration of the power steering device of one embodiment of the present invention.

The rack and pinion power steering device 1 shown in FIG. 1 has an input shaft 2, which is connected to the steering wheel H of a vehicle 10, and an output shaft 4, which is connected to the input shaft 2 by way of a torque sensor 3. The output shaft 4 is connected to a pinion 6 by way of a universal joint 5. The wheel 8 that is to be steered is connected to a rack 7 which meshes with the pinion 6. The steering torque is thus transmitted by way of this mechanism from the steering wheel H through the input shaft 2, the torque sensor 3, the output shaft 4 and the pinion 6 to the rack 7 whose movement in turn steers the vehicle 10.

Figure 2:
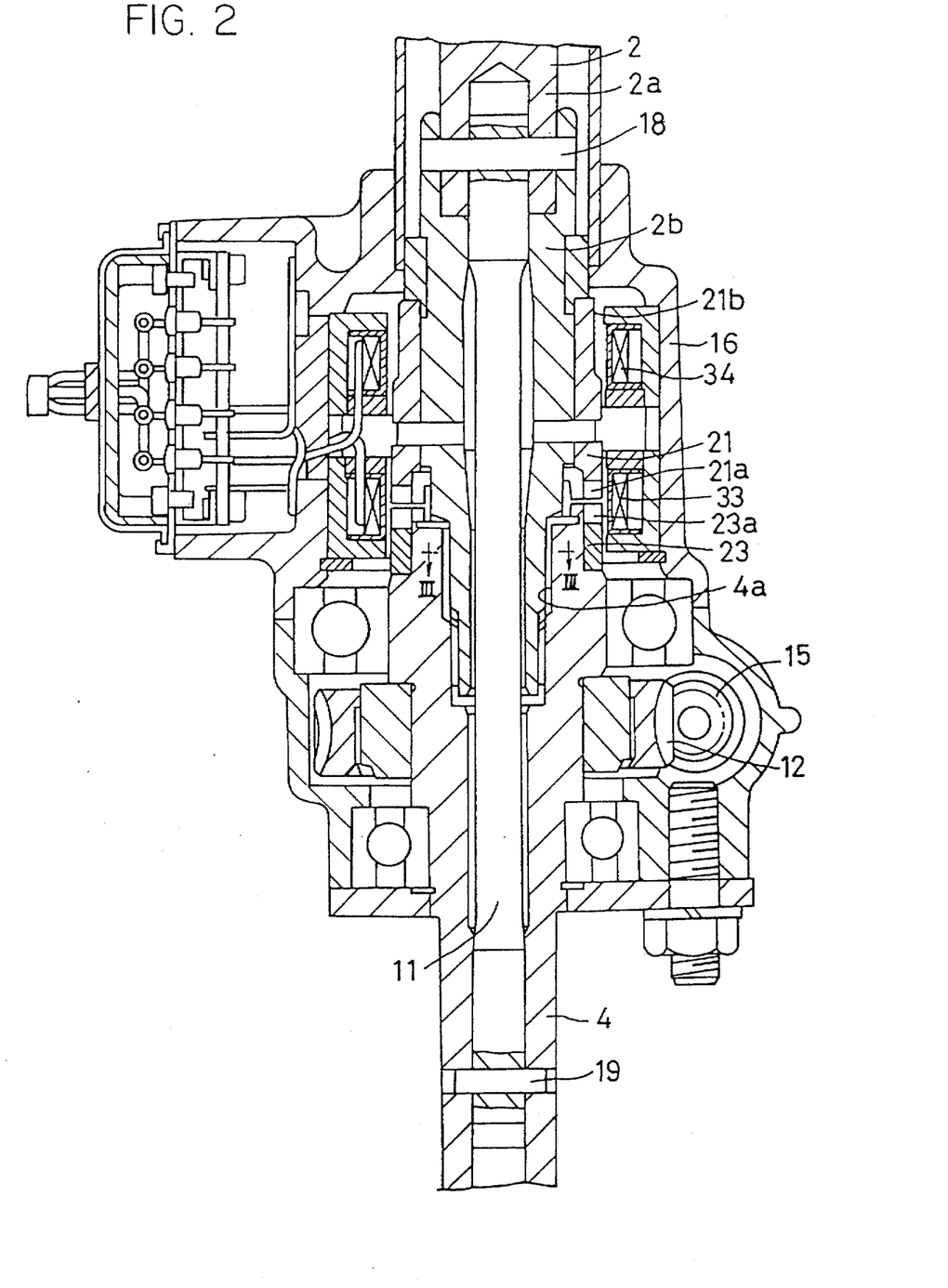
FIG. 2: A cross sectional view of the torque sensor of one embodiment of the present invention.
Figure 3:
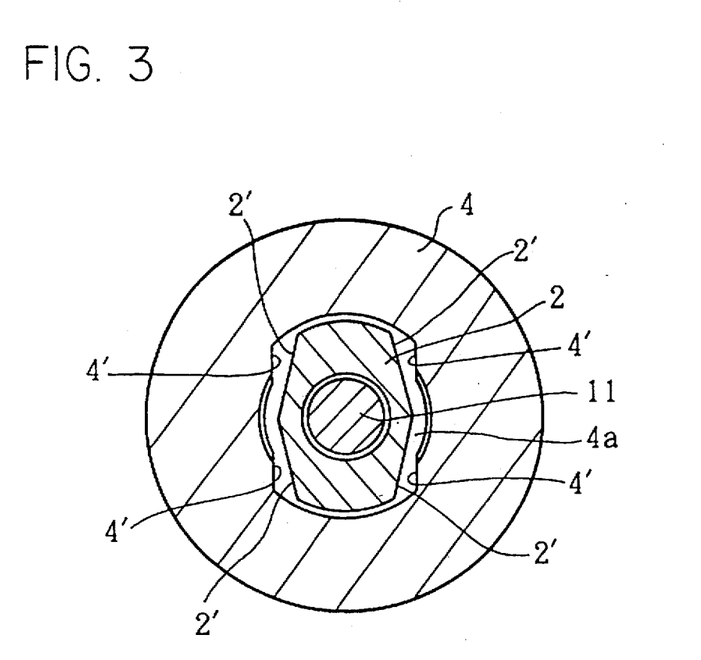
FIG. 3: A cross section taken substantially on line III—III of FIG. 2.

As shown in FIG. 2, the input shaft 2 and the output shaft 4 are connected by pins 18,19 to either end of a torsion bar 11. This enables the input shaft 2 and the output shaft 4 to rotate relative to each other in response to the steering torque. The input shaft 2 is configured such that a first shaft 2a on the steering wheel H side is connected by pin 18 with a second shaft 2b on the torque sensor 3 side. One end of the input shaft 2 slots into the cutout 4a at one end of the output shaft 4. As shown in FIG. 3, part of the outer circumference of the input shaft 2 and part of the inner circumference of the cutout 4a of the output shaft 4 are finished in such a way that their non-circular sections 2',4' are positioned opposite each other. By bringing the non-circular part 2' of the input shaft 2 and the non-circular part 4' of the output shaft 4 into contact with each other, it is possible to set the relative rotation capacity of the input and output shafts 2,4 within a specific range and, in so doing, to prevent the torsion bar 11 from being damaged. As shown in FIG. 2, the outer circumference of the output shaft 4 is fitted into a worm wheel 12 which is in turn meshed with a worm gear 15. As shown in FIG. 1, the worm gear 15 is connected by way of an electromagnetic clutch 14 to a power assistance motor (actuator) 13.

As shown in FIG. 2, the torque sensor 3 has a housing 16 in which the input shaft 2 and the output shaft 4 are inserted so as to enable the shaft 2,4 to turn relative to the housing 16. A first magnetic detector ring 21 is fitted around the input shaft 2 in such a way as to enable it to turn together with the shaft 2. A second magnetic detector ring 23 is fitted around the output shaft 4 in such a way as to enable it to turn together with the shaft 4. The detection rings 21,23 are positioned such that one end surface of the first detection ring 21 and the other end surface of the second detection ring 23 are opposite to each other. Each of the two detection rings 21,23 has a plurality of teeth 21a,23a around the circumference of their end surfaces, which are opposite to each other. In the first detection ring 21, the outer circumference adjacent to the other end surface has a narrow diameter part 21b whose diameter is narrower than the diameter of the outer circumference adjacent to the one end surface. The housing 16 also contains a first detection coil 33, which surrounds the gap between the two detection rings 21,23, and a second detection coil 34, which surrounds the narrow diameter part 21b of the first detection ring 21. The two detection coils 33,34 make up the signal processing circuit shown in FIG. 4. To be more precise, the first detection coil 33 is connected by way of a resistance 45 to an oscillator 46 and the second detection coil 34 is connected by way of a resistance 47 to the oscillator 46. Both detection coils 33,34 are then connected to a differential amplifier 48.

The transmission of steering torque from the input shaft 2 to the output shaft 4 causes the torsion bar 11 to twist, and the first and second detection rings 21,23 to rotate relative to each other. This causes the lapping areas of the teeth 21a,23a on the two detection rings 21,23 in relation to axial direction of the shaft 2,4 to change. This change causes a change in the magnetic reluctance between the teeth 21a,23a, so that the output of the first detection coil 33 is varied. The steering torque which corresponds to this output is thus detected. In other words, the torque sensor 3 can continue to detect steering torque up to the detection limit point at which the aforementioned non-circular section 2' of the input shaft 2 comes into contact with the non-circular section 4' of the output shaft 4.

Figure 4:
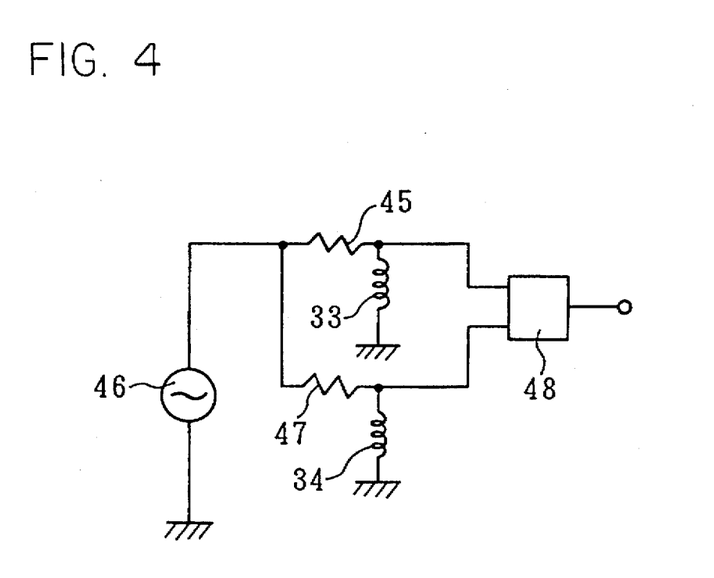
FIG. 4: Circuit diagram of the torque sensor of one embodiment of the present invention.

The diameter of the narrow diameter part 21b of the first detection ring 21 is set such that, when steering torque is not being applied, the magnetic reluctance at the first detection coil 33 side is equal to that at the second detection coil 34 side. Since fluctuations in the output of the first detection coil 33 due to temperature changes are thus made equal to the fluctuations in the output of the second detection coil 34 due to the temperature changes, the fluctuation in the output of the first detection coil 33 is canceled out by the differential amplifier 48. The effect of this is to compensate for fluctuations in the detected value of the transmitted torque attributable to fluctuations in temperature.

The relative positions of the input shaft 2 and the output shaft 4 are set such that the output of the torque sensor 3 is zero whenever torque is not being applied. This setting of the relative positions of the shafts 2,4 also ensures that the torque sensor's absolute output value when the vehicle is steered to the right as far as the aforementioned detection limit is equal to its absolute output value when the vehicle is steered to the left as far as the detection limit. Thus, when the steering device 1 is being assembled, the torsion bar 11 is connected to the shafts 2,4 by pins 18,19 after the relative positions of the input and output shafts 2,4 are determined as stated above. The relative positions are themselves determined on the basis of actual output tests.

As shown in FIG. 1, the torque sensor 3 is connected to a controller 50, which incorporates a computer which holds a control program in its memory. The controller 50 is also connected to the aforementioned motor 13, the aforementioned electromagnetic clutch 14, a vehicle velocity sensor 51, a steering wheel steering angle sensor 52, and to a plurality of obstacle sensors 53,54,55,56 fitted at different points around the body of the vehicle 10. To enable the obstacle sensors 53,54,55,56 to detect an obstacle, such as another vehicle, a barrier or the like, adjacent to the left or right of the driver's vehicle or else adjacent to the left rear or right rear of the driver's vehicle, each sensor incorporates a transmitter, which emits laser or ultra-sonic radar waves from the vehicle, a radar wave receiver, and a radar wave amplifier. The controller 50 computes the distance between the driver's vehicle and an obstacle on the basis of the time difference between emission and receipt of the radar waves.

Figure 5:
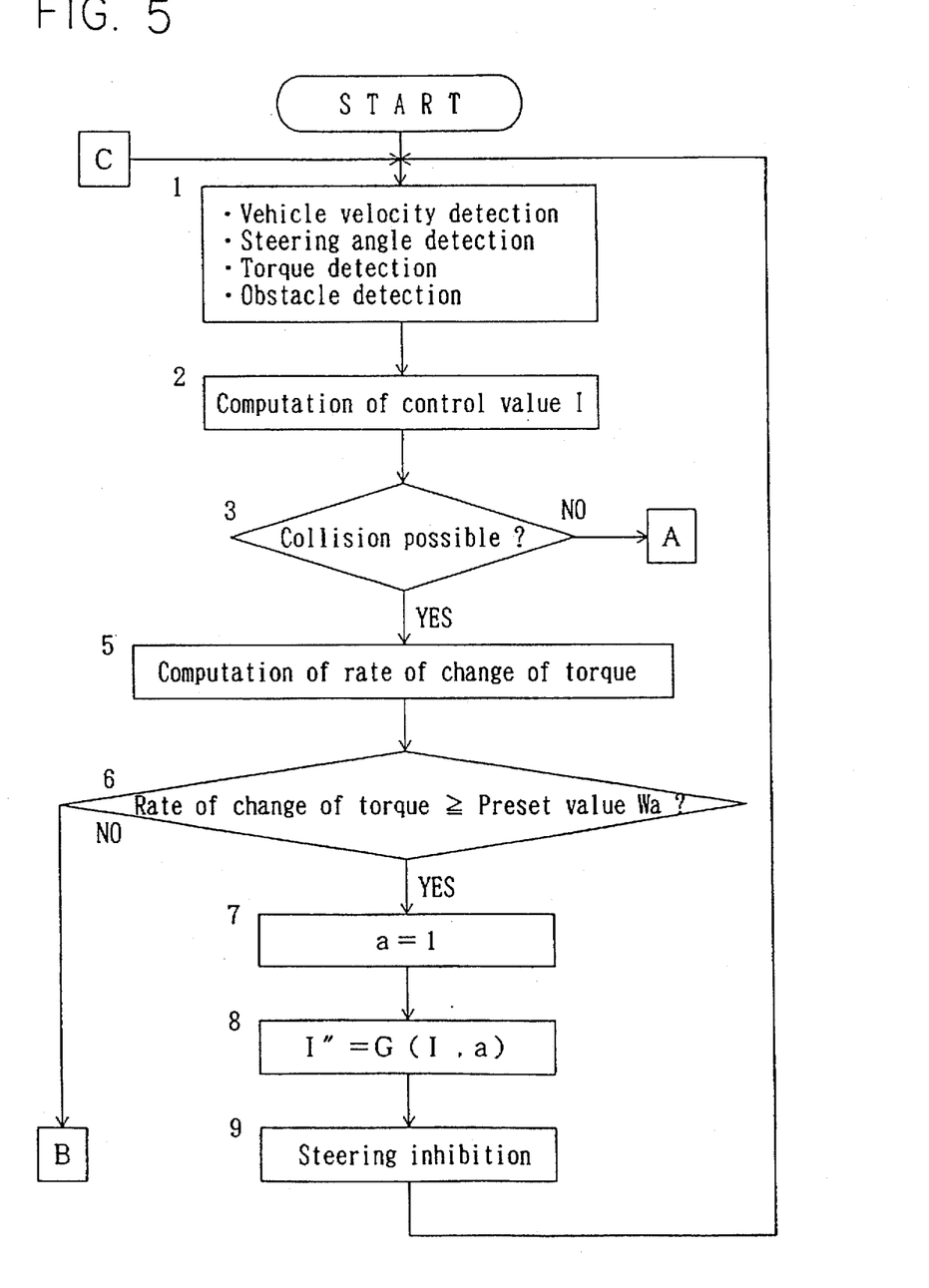
FIG. 5, FIG. 6: Flow charts showing the control procedure of the power steering device of one embodiment of the present invention.
Figure 6:
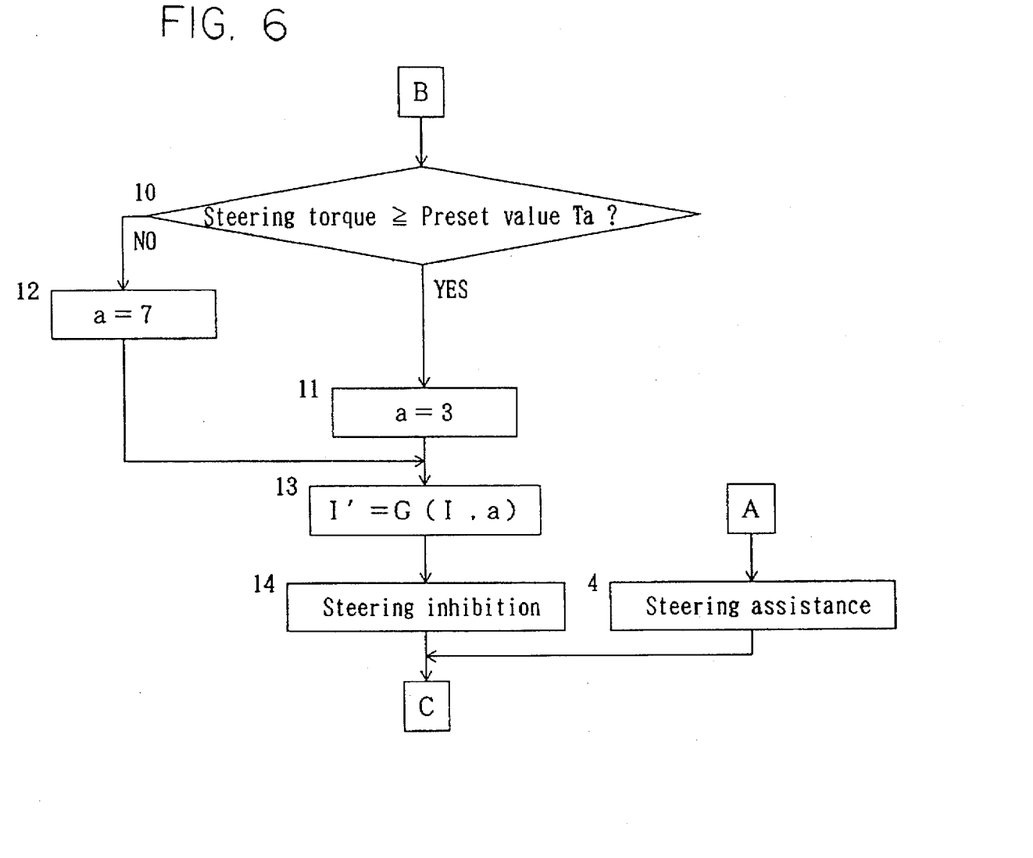

The control procedure, which is subject to the control program stored in the controller 50, is explained by reference to the flow charts in FIG. 5 and FIG. 6 below.

First, the controller 50 reads in signals from the torque sensor 3, the vehicle velocity sensor 51, the steering angle sensor 52, and the obstacle sensors 53,54,55,56 (Step 1).

Next, the controller 50 computes a control value I according with the drive current for the steering power assistance motor 13 (Step 2). This control value I corresponds to the detected steering torque. In other words, the control value I is determined so as to generate steering assistance power in line with the size of the steering torque. In the present embodiment, the control value I varies depending on the detected velocity and the steering angle of the driver's vehicle. To be more precise, the control value I is determined such that, when the vehicle is moving slowly and the steering angle is large, a large amount of steering assistance power is generated to help the turning of the vehicle. While, when the vehicle is moving quickly and the steering angle is only small, the control value I generates only a limited amount of steering assistance power, thereby enhancing the stability of the vehicle when moving at high speed.

Next, the controller 50 uses the detected steering torque to determine the steering direction, and then, with the help of obstacle detection signals received from whichever of the obstacle detection sensors 53,54,55,56 positioned in the steering direction, it determines whether or not the vehicle is in danger of colliding with an obstacle (Step 3). For example, if an obstacle is detected in the steering direction within a predetermined distance from the vehicle, the controller determines that there is a possibility of a collision.

If there is no possibility of a collision, the controller 50 outputs the control value I computed as per Step 2 to the motor 13, such that power assistance is supplied to assist the steering operation (Step 4), and then returns to Step 1.

If it is determined in Step 3 that there is a possibility of collision, the controller 50 then detects the steering torque as a time series and computes the rate of change of the detected steering torque (Step 5).

Next, the controller 50 determines whether or not the rate of change of the detected steering torque exceeds a preset value Wa (Step 6). The preset value Wa corresponds to the rate of change of the steering torque that is required to force the steering torque value up beyond the detection limit of the torque sensor 3. In other words, under normal driving conditions when the rate of change of the steering torque is fairly slow, the steering torque is not forced up beyond the detection limit point of the torque sensor 3. When the steering torque value is changing very rapidly, on the other hand, it is likely to exceed the detection limit of the torque sensor 3. The Wa value is thus preset such that, if the rate of change of steering torque exceeds the value, then the steering torque reaches the detection limit of the torque sensor 3. The practical value used as the preset value Wa tends to vary depending on the type of vehicle, therefore the preset value Wa is best established by tests carried out on the individual type of vehicle.

In cases in which the rate of change of the steering torque is greater than the preset value Wa, the controller 50 sets the coefficient a of function G (I,a), which is described in more detail below, to 1 for the maximum steering inhibition (Step 7).

Next, the controller 50 modifies the control value I computed in Step 2, to carry out steering inhibition (Step 8). The control value I" after modification for the steering inhibition is a function G (I,a) of the control value I prior to the modification.

In this embodiment, when the control value after modification for the maximum steering inhibition is I", the offset value is F, and the coefficient is a, a function is defined by the following expression I"=G(I,a)=F−[(I−F)/a]. The coefficient a of the function G(I,a) is 1 in step 7. As explained below, when the rate of change of the detected steering torque is less than the preset value Wa, the coefficient a is more than 1. In other words, in cases in which the rate of change of the detected steering torque is greater than the preset value Wa, the function G(I,a) is varied such that the degree of steering inhibition is increased by comparison with a situation in which the rate of change of the detected steering torque is less than the preset value Wa. Thus, when the steering torque at the point when the possibility of collision with an obstacle arises is large, steering inhibition can be increased to match the size of the control value I—i.e. the steering torque—, thereby preventing the application of steering inhibition from being inadequate, and giving the driver clear warning that there is an obstacle in his/her path. Also, when the steering torque at the point when the possibility of collision with an obstacle arises is small, steering inhibition can be reduced to match the size of the control value I—i.e. the steering torque—, thereby eliminating excessive steering inhibition, and preventing the driver from making unnecessary handling errors.

The offset value F is the control value of the motor 13 in a steady state immediately before the application of steering inhibition. The steady state refers to the situation in which steering torque is not changing over time, for example, it represents a situation in which the vehicle is maintaining a straight course or else the vehicle is maintaining a constant cornering curve. The offset value F is thus zero in cases in which the vehicle is on a straight course immediately before the application of steering inhibition. Also, the offset value F is a fixed value in accordance with the vehicle's velocity and steering angle in cases in which the vehicle is maintaining a constant cornering curve immediately before the application of steering inhibition. For example, the controller 50 can determine whether or not the vehicle is maintaining a steady steering condition by recording control value I at fixed intervals (say, every 10 milliseconds) and comparing each freshly recorded value with the previous value. If the recorded value remains constant over time, then the steering condition is a steady state. It is possible, for example, to treat the last recorded value in a steady state prior to the application of steering inhibition as the offset value F. It is equally possible to treat the average of the last several recorded values in a steady state prior to the application of steering inhibition as the offset value F. By treating this offset value F as a reference value for steering inhibition purposes, it is possible to apply a suitable level of steering inhibition in response to the vehicle's running condition. In other words, if the level of steering inhibition applied after the vehicle is maintaining a constant cornering curve is the same that which is applied after the vehicle is maintaining a straight course, although the control value I is the same in both running conditions, the level of steering inhibition after the constant cornering conditions becomes to excessive. On the other hand, by applying steering inhibition by reference to the offset value F, it is possible to optimize the level of steering inhibition under cornering condition.

Next, the controller 50 carries out steering inhibition by outputting the control value to the motor 13 (Step 9) and then returns to Step 1. When the rate of change of the steering torque remains within the preset value Wa, the control value I prior to modification is modified to the control value I', which is described in more detail below. On the other hand, when the rate of change of the steering torque exceeds the preset value Wa, the control value I prior to modification is modified to the control value I" as stated above. This control value I" after modification changes such that the level of steering inhibition is gradually reduced.

Figure 7A:
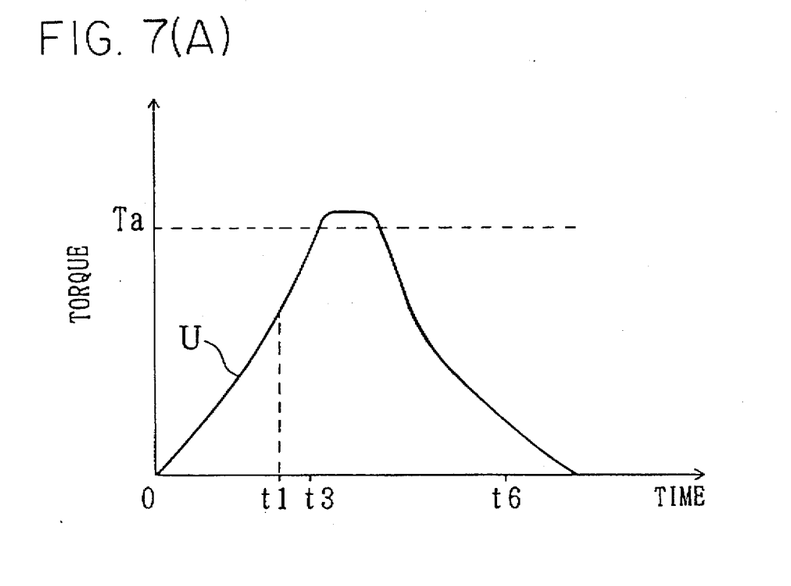
FIG. 7(A): Graph illustrating the relationship, in one embodiment of the power steering device of the present invention, between detected torque and time in the event that the rate of change of the steering torque detected by the torque sensor is greater than the preset value.
Figure 7B:
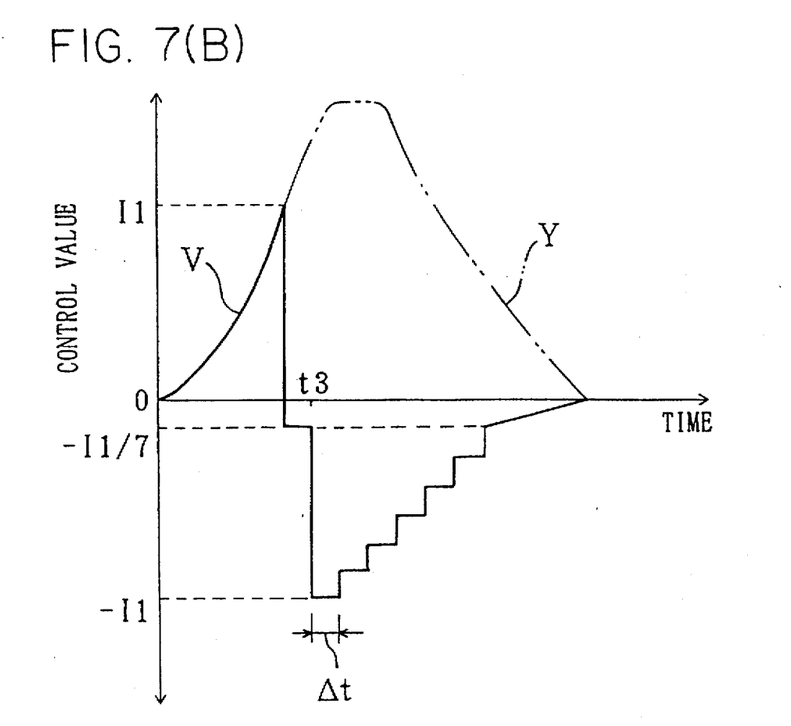
FIG. 7(B): Graph illustrating the relationship between the control value and time under similar circumstances to those outlined in FIG. 7(A) above.
Figure 8:
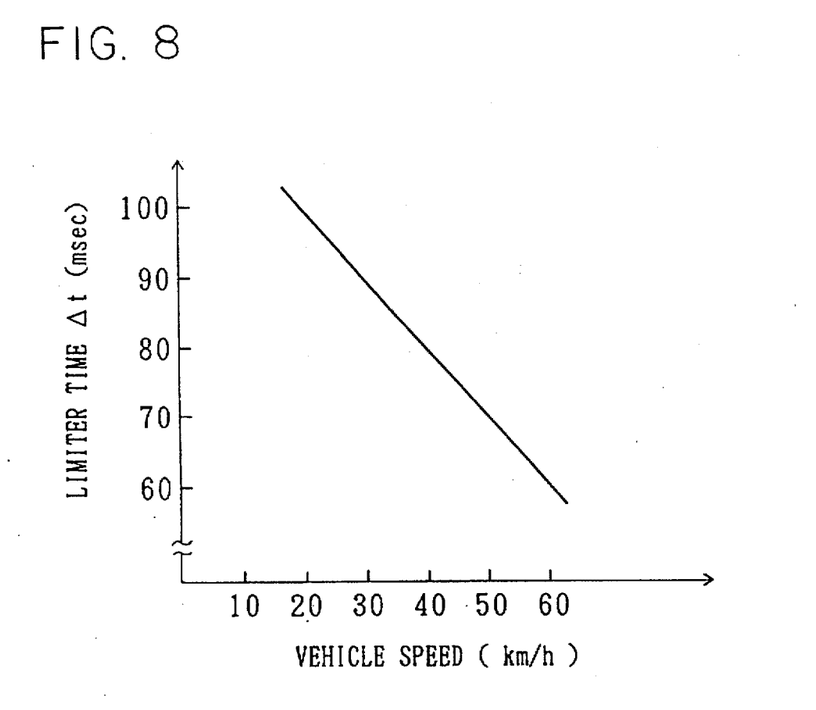
FIG. 8: Graph illustrating the relationship between vehicle speed and limiter time in the power steering device controller of one embodiment of the present invention.

In FIG. 7(A), for example, the solid line U traces the change in steering torque over time detected by the torque sensor 3. In this example, the steering torque changes so quickly that it exceeds the detection limit of the torque sensor 3. In this example, the offset value F is zero, the possibility of collision arises at time t1, the rate of change of the steering torque is determined to be in excess of the preset value Wa at time t3, and then the steering torque rises beyond a preset value Ta to reach its maximum value (the detection limit of the torque sensor 3), after which the steering torque falls back to zero. In this example, as shown by the solid line V in FIG. 7(B), the control value I is risen in line with the increase in steering torque to reach point I1 at time t1. This reflects the increasing of steering assistance power until the point. At time t1, the control value is modified to I'=G(I=I1, a=7)=−I1/7 and steering inhibition is duly applied. Next, when the rate of change of the steering torque rises above the preset value Wa—in other words, at time t3—the control value is modified to I"=G(I=I1, a=1)= −I1 and the level of steering inhibition is increased to the maximum level. And then the control value is varied such that the level of steering inhibition is gradually reduced. In the present embodiment, the control value is reduced step by step (for example, I1/7 per step) at limiter time (Δt) intervals corresponding to the velocity of the vehicle. FIG. 8 gives an example in which the limiter time Δt becomes smaller as the vehicle's velocity increases. At time t6, when the control value returns to the same value (−I1/7) as the aforementioned I', the control procedure returns to Step 1. In FIG. 7(B), the double dotted chain line Y illustrates the change of control value I over time assuming steering inhibition is not applied.

In Step 6, if the rate of change of the steering torque is less than the preset value Wa, the controller 50 determines whether or not the detected steering torque is more than the preset value Ta (Step 10). The value Ta is preset in accordance with the detection limit value of the torque sensor 3. In the present embodiment, the steering torque value detected at the point, when the non-circular section 2' of the aforementioned input shaft 2 and the non-circular section 4' of the output shaft 4 come into contact with each other, is the detection limit value of the torque sensor 3. The actual detection limit value of the torque sensor 3 tends to fluctuate from the design value due to extraneous factors such as noise. For this reason, there is a possibility to misjudge that the steering torque which actually reaches the detection limit does not reach the detection limit, if the judgement is carried out based on the design value. Therefore it is advisable the preset value Ta is smaller than the design value. For example, if the absolute detection limit value suggested in the design specifications is 85 kgf.cm, the value Ta is preset to 80 kgf.cm.

Next, when the detected steering torque is greater than the preset value Ta, the controller 50 sets the coefficient a, which is used to specify the aforementioned function G(I,a), to 3 (Step 11). When the detected steering torque is less than the preset value Ta, the controller 50 sets the coefficient a to a value which is preset in accordance with the vehicle velocity and stored (Step 12). The value, which accords with the vehicle velocity and is treated as the coefficient a when the detected steering torque is less than the preset value Ta, is preset to a value greater than the value, which is treated coefficient a when the detected steering torque is greater than the preset value Ta. In this embodiment, the controller 50 sets the coefficient a to 7 in Step 12.

Next, the controller 50 modifies the control value I computed in Step 2, to carry out steering inhibition (Step 13). The control value I' after the modification is a function G (I,a) of the control value I prior to the modification. As above, when the detected steering torque is greater than the preset value Ta, the coefficient a is set to 3 in Step 11 whereas, when the detected steering torque is less than the preset value Ta, coefficient a is set to 7 in Step 12. Thus, when the detected steering torque is greater than the preset value Ta, the degree of steering inhibition dictated by the control value I'=G(I,a) after the modification is increased by comparison with a situation in which the detected steering torque is less than the preset value Ta. In other words, when the detected steering torque is greater than the preset value Ta, the function G(I,a) is modified such that the degree of steering inhibition is increased by comparison with a situation in which the value of the steering torque is less than the preset value Ta.

Next, the controller 50 carries out steering inhibition by outputting the control value I', which is modified in Step 13, to the motor 13 (Step 14) and then returns to Step 1.

Figure 9A:
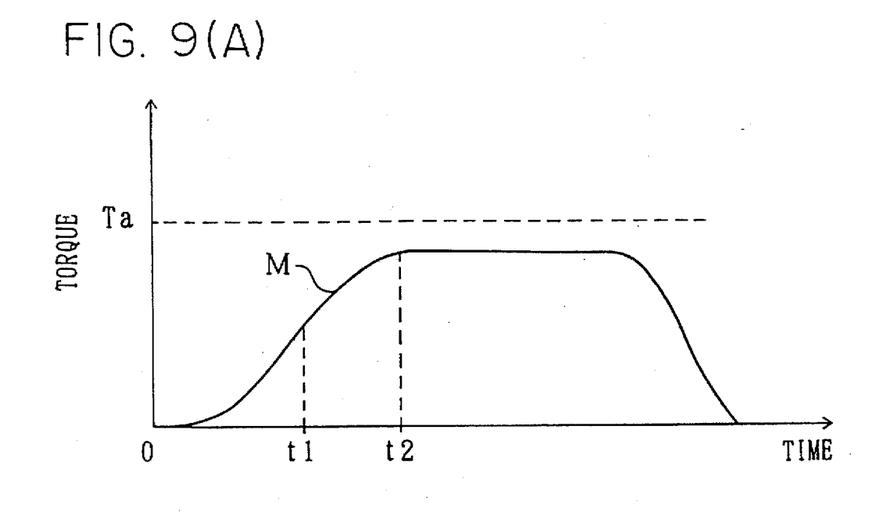
FIG. 9(A): Graph illustrating the relationship, in one embodiment of the power steering device of the present invention, between detected torque and time in the event that the steering torque detected by the torque sensor is less than the preset value.
Figure 9B:
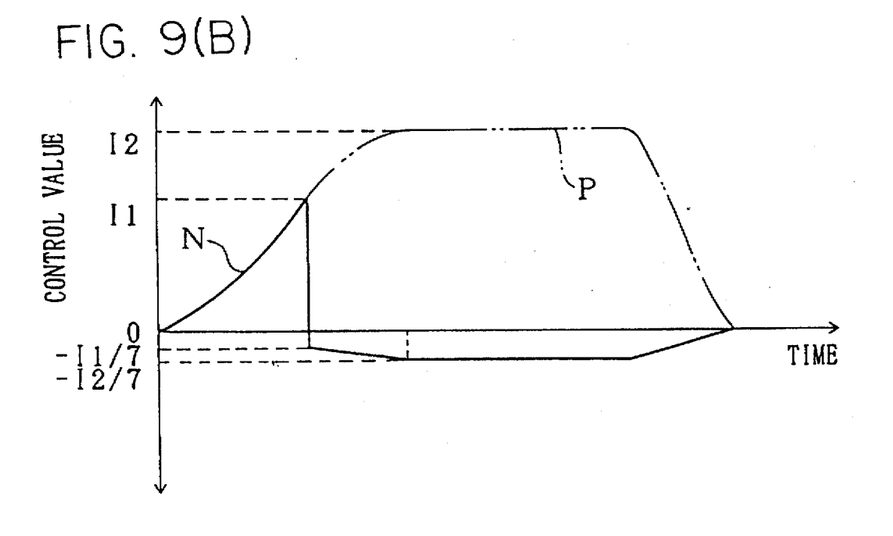
FIG. 9(B): Graph illustrating the relationship between the control value and time under similar circumstances to those outlined in FIG. 10(A) above.

For example, the solid line M in FIG. 9(A) traces the change in steering torque over time detected by the torque sensor 3. In this example, the steering torque never increases beyond the preset value Ta. In this example, the offset value F in the function G(I,a) is zero, the value of a corresponding to the vehicle velocity in Step 12 is 7, the rate of change of the steering torque is less than the aforementioned preset value Wa, at time t1 the possibility of collision arises, at time t2 the steering torque attains its maximum value, which is less than the preset value Ta, and finally the steering torque settles back to zero. In the present example, the control value I, which is represented by the solid line N in FIG. 9(B), increases in line with the steering torque up to I1 at time t1, and power assistance for steering is applied accordingly. Next, at time t1, the control value is modified to I'=G(I=I1, a=7)=–I1/7, and steering inhibition is applied. Next, at time t2, after being reduced in accordance with the increase in steering torque, the control value is changed to I'=G(I=I2, a=7)=–I2/7. Next, the control value is changed in line with the decline in steering torque, and finally it settles back to zero. Furthermore, the double dotted chain line P in FIG. 9(B) illustrates the change of control value I over time assuming steering inhibition is not applied.

Figure 10A:
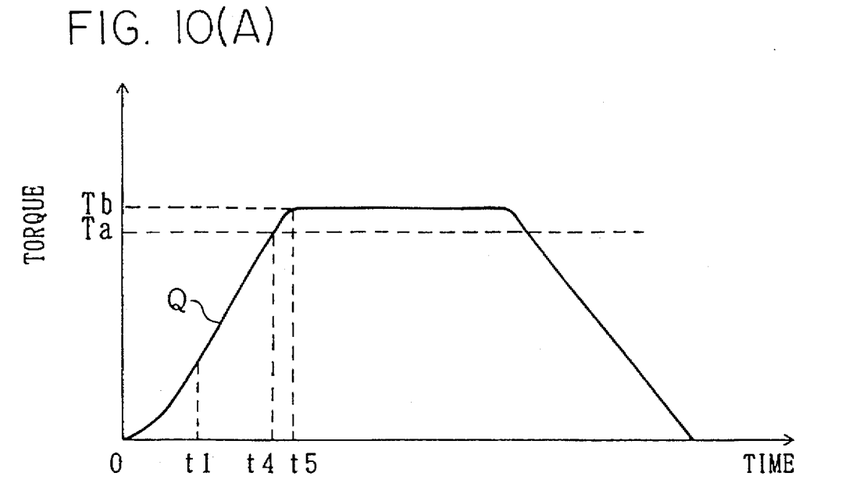
FIG. 10(A): Graph illustrating the relationship, in one embodiment of the power steering device of the present invention, between detected torque and time in the event that the steering torque detected by the torque sensor is more than the preset value.
Figure 10B:
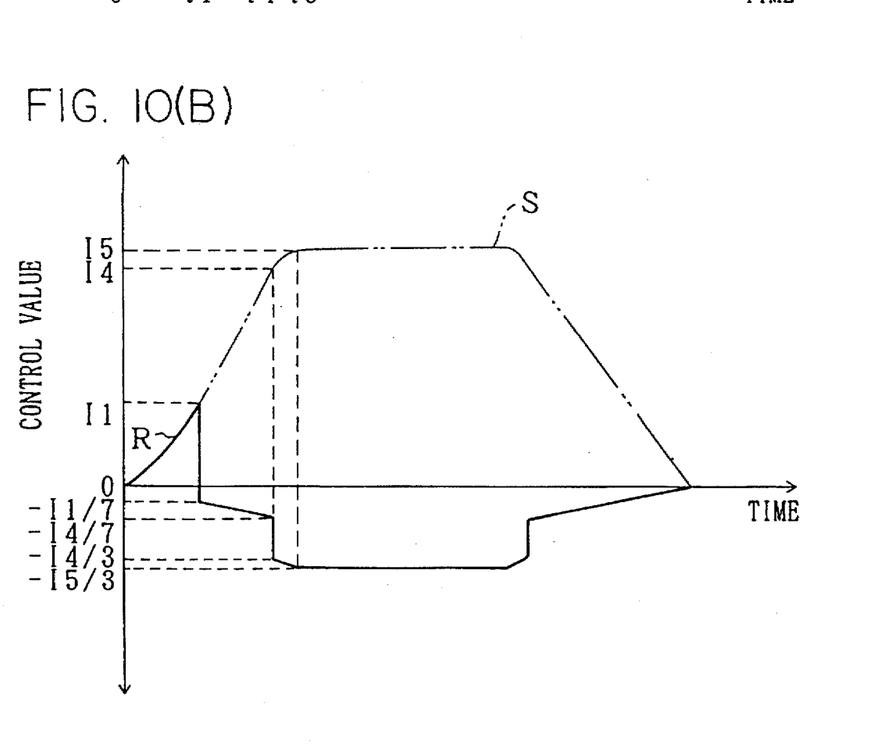
FIG. 10(B): Graph illustrating the relationship between the control value and time under similar circumstances to those outlined in FIG. 10(A) above.

For example, the solid line Q in FIG. 10(A) traces the change in steering torque over time detected by the torque sensor 3. In this example, the steering torque increases beyond the preset value Ta. In this example, the offset value F is zero, the value of a corresponding to the vehicle velocity in Step 12 is 7, the rate of change of the steering torque is less than the aforementioned preset value Wa, at time t1 the possibility of collision arises, at time t4 the steering torque reaches the preset value Ta, at time t5 the steering torque attains its maximum value Tb, and finally the steering torque settles back to zero. In the present example, the control value I, which is represented by the solid line R in FIG. 10(B), increases in line with the steering torque up to I1 at time t1, and power assistance for steering is applied accordingly. Next, at time t1, the control value is modified to I'=G(I=I1, a=7)=–I1/7, and steering inhibition is applied. Next, the control value is changed in accordance with the increase in steering torque. Next, at time t4, since the value of a is reduced to 3 in the abovementioned Step 11, the control value is changed to I'=G(I=I4, a=3)=–I4/3 from I'=G(I=I4, a=7)=–I4/7. This causes the degree of steering inhibition to be increased. Next, the control value is changed in line with the increase in steering torque after which, at time t5, it reaches I'=G(I=I5, a=3)=–I5/3. Next, the control value is changed in line with the decline in steering torque, and finally it settles back to zero. Furthermore, the double dotted chain line S in FIG. 10(B) illustrates the change of control value I over time assuming steering inhibition is not applied.

A power steering device configured as outlined above has the capacity to carry out steering inhibition by modifying the control value applied to the motor 13 that generates the steering assistance power, in the event that a collision with a nearby obstacle looks imminent. By making the control value after the modification for the steering inhibition a function G(I,a) of the control value I prior to the modification, it is possible to increase the degree of steering inhibition to match the size of the steering torque, when the steering torque at the point when the possibility of colliding with a nearby obstacle is large. This prevents the degree of steering inhibition from becoming inadequate, providing the driver with clear warning that he/she is in imminent danger of colliding with a nearby obstacle. Also, the degree of steering inhibition can be reduced to match the size of the steering torque, when the steering torque at the point when the possibility of colliding with a nearby obstacle arises is small, thereby precluding the occurrence of excessive steering inhibition and preventing the driver from making a mistake in his/her handling of the vehicle.

Again, when the detected steering torque is greater than the preset value Ta, which corresponds to the detection limit of the torque sensor 3, the function G(I,a) is varied such that the degree of steering inhibition is increased by comparison with a situation in which the detected steering torque is less than the preset value Ta. This configuration ensures that a sufficient level of steering inhibition is applied, providing the driver with clear warning that he/she is in imminent danger of colliding with a nearby obstacle.

Again, when the rate of change of the detected steering torque is greater than the preset value Wa, which corresponds to the rate of change that is required to force the steering torque value up beyond the detection limit of the torque sensor 3, the function G(I,a) is varied such that the degree of steering inhibition is increased by comparison with situation in which the rate of change of the detected steering torque is less than the preset value Wa. This configuration ensures that a sufficient level of steering inhibition is applied, providing the driver with clear warning that he/she is in imminent danger of colliding with a nearby obstacle.

Again, although the detection limit of the torque sensor 3 is dependent on the precision of assembly of the torque sensor 3, the function G(I,a) can be modified as necessary without receiving any influence of the precision of assembly of the torque sensor 3, because the question of whether or not the steering torque reaches the detection limit or not can be determined by reference to the rate of change of the steering torque, which is independent of the precision with which the torque sensor is assembled.

Moreover, when the rate of change of the detected steering torque is greater than the preset value Wa, the control value after modification is determined such that the degree of steering inhibition is gradually reduced. Therefore, it is possible first to boost the degree of steering inhibition to ensure that the driver realizes that he/she is in danger of colliding with a nearby obstacle, and thereafter to prevent the level of steering inhibition from becoming excessive.

The present invention is not limited to the embodiment outlined above. For example, the functional expression whereby the control value after the modification for the steering inhibition is determined by reference to the control value prior to the modification, and the coefficients used in that function need not to be limited to those in the above embodiment. Again, there is no particular limitation on the type of obstacle detection means used. For example, using another known technology, pictures of the area surrounding the driver's vehicle taken by a CCD camera can be subjected to image processing, the results of the processing being subsequently used to determine whether or not there is an obstacle in the vicinity of the driver's vehicle. There is, moreover, no particular limitation on the sort of means used to detect the steering direction. For example, the direction of steering can be determined by reference to the vehicle's winker operation signals. Similarly, in the embodiment outlined above, when the rate of change of the detected steering torque is greater than the preset value, the control value after the modification is programmed to decline in steps in accordance with limiter time $\Delta t$, which is based on the vehicle's velocity, thereby gradually reducing the degree of steering inhibition. It can be equally acceptable, on the other hand, to program the controller such that, as the vehicle's velocity increased, the control value after the modification for the steering inhibition can follow a smooth downward curve and, in so doing, fall quickly to zero. It is also possible to give the aforementioned limiter time $\Delta t$ a fixed value and to vary the control value in each limiter time period by reference to the velocity of the vehicle.

What is claimed is:

1. A power steering device, comprising:
   means for detecting a steering torque;
   means for controlling the steering assistance power generation actuator by using a control value corresponding to the detected steering torque;
   means for determining whether or not there is a possibility of collision between the vehicle and an obstacle detected in the steering direction; and
   means for modifying said control value such that the vehicle's steering is inhibited when there is the possibility of collision; wherein:
   the control value after the modification for the steering inhibition is a function of the control value prior to the modification; and wherein:
   when the detected steering torque is greater than a preset value, the function is modified such that the degree of steering inhibition is increased by comparison with a situation in which the detected steering torque is less than the preset value.

2. A power steering device, comprising:
   means for detecting a steering torque;
   means for controlling the steering assistance power generation actuator by using a control value corresponding to the detected steering torque;
   means for determining whether or not there is a possibility of collision between the vehicle and an obstacle detected in the steering direction; and
   means for modifying said control value such that the vehicle's steering is inhibited when there is the possibility of collision; wherein:
   the control value after the modification for the steering inhibition is a function of the control value prior to the modification; and wherein:
   when the rate of change of the detected steering torque is greater than a preset value, the function is modified such that the degree of steering inhibition is increased by comparison with a situation in which the rate of change of the detected steering torque is less than the preset value.

3. A power steering device, comprising:
   means for detecting a steering torque;
   means for controlling the steering assistance power generation actuator by using a control value corresponding to the detected steering torque;
   means for determining whether or not there is a possibility of collision between the vehicle and an obstacle detected in the steering direction; and
   means for modifying said control value such that the vehicle's steering is inhibited when there is the possibility of collision; wherein:
   the control value after the modification for the steering inhibition is a function of the control value prior to the modification; wherein:
   when the detected steering torque is greater than a preset value, the function is modified such that the degree of steering inhibition is increased by comparison with a situation in which the detected steering torque is less than the preset value; and wherein:
   when the rate of change of the detected steering torque is greater than a preset value, the function is modified such that the degree of steering inhibition is increased by comparison with a situation in which the rate of change of the detected steering torque is less than the preset value.

4. The power steering device according to claim 2, wherein:
   when the rate of change of the detected steering torque is greater than the preset value, the control value after modification is determined such that the degree of steering inhibition is gradually reduced.

5. The power steering device according to claim 3, wherein:
   when the rate of change of the detected steering torque is greater than the preset value, the control value after modification is determined such that the degree of steering inhibition is gradually reduced.

* * * * *